United States Patent
Millet et al.

(10) Patent No.: US 9,207,312 B2
(45) Date of Patent: Dec. 8, 2015

(54) MULTI-TARGET DATA PROCESSING FOR MULTI-RECEIVER PASSIVE RADARS IN AN SFN OR MFN MODE

(75) Inventors: Nicolas Millet, Villebon sur Yvette (FR); Sébastien Allam, Antony (FR); Mathieu Klein, Gif sur Yvette (FR); Thierry Malherbe, Limours en Hurepoix (FR)

(73) Assignee: THALES, Neuilly sur Seine (FR)

( * ) Notice: Subject to any disclaimer, the term of this patent is extended or adjusted under 35 U.S.C. 154(b) by 795 days.

(21) Appl. No.: 13/393,602

(22) PCT Filed: Aug. 30, 2010

(86) PCT No.: PCT/EP2010/062643
§ 371 (c)(1),
(2), (4) Date: Aug. 23, 2012

(87) PCT Pub. No.: WO2011/026810
PCT Pub. Date: Mar. 10, 2011

(65) Prior Publication Data
US 2012/0306686 A1 Dec. 6, 2012

(30) Foreign Application Priority Data
Sep. 1, 2009 (FR) .................................... 09 04144

(51) Int. Cl.
*G01S 13/72* (2006.01)
*G01S 13/00* (2006.01)
(Continued)

(52) U.S. Cl.
CPC ............. *G01S 13/003* (2013.01); *G01S 13/726* (2013.01); *G01S 13/878* (2013.01)

(58) Field of Classification Search
CPC ... G01S 5/0284; G01S 5/0289; G01S 5/0294; G01S 7/295; G01S 7/53; G01S 3/325; G01S 13/66–13/726; G01S 13/003

USPC ................................................. 342/59, 94–99
See application file for complete search history.

(56) References Cited

U.S. PATENT DOCUMENTS 5,138,321 A * 8/1992 Hammer ......................... 342/36
5,414,643 A * 5/1995 Blackman et al. .............. 342/95
(Continued)

FOREIGN PATENT DOCUMENTS

FR 2933775 1/2010

OTHER PUBLICATIONS

International Search Report for PCT/EP2010/062643 dated Nov. 19, 2010.

*Primary Examiner* — Peter Bythrow
(74) *Attorney, Agent, or Firm* — Snell & Wilmer L.L.P.

(57) ABSTRACT

The invention relates to a data processing method for a multistatic radar system comprising a plurality of transmitters and receivers, each receiver being associated with one or more transmitters so as to form one or more bistatic bases. According to the invention, the method involves producing and sustaining multi-receiver Cartesian tracks from bistatic blips produced by the various receivers, and comprises: a first step in which mono-receiver Cartesian tracks are produced and sustained, each mono-receiver track consisting of blips formed by a given receiver; and a second step in which multi-receiver Cartesian tracks are produced and sustained, each multi-receiver track being constituted by merging the mono-receiver tracks together and with bistatic blips which have not been associated with a mono-receiver track. The produced tracks are transmitted together with the attributes thereof to processing means operating upstream from the method.

15 Claims, 6 Drawing Sheets

(51) Int. Cl.
  *G01S 7/53* (2006.01)
  *G01S 3/32* (2006.01)
  *G01S 5/02* (2010.01)
  *G01S 13/87* (2006.01)

(56) References Cited

U.S. PATENT DOCUMENTS

| | | | |
|---|---|---|---|
| 5,798,942 A * | 8/1998 | Danchick et al. | 342/96 |
| 5,805,101 A * | 9/1998 | Bodenmueller et al. | 342/41 |
| 5,842,156 A * | 11/1998 | Hong et al. | 702/179 |
| 6,232,922 B1 * | 5/2001 | McIntosh | 342/453 |
| 6,268,803 B1 * | 7/2001 | Gunderson et al. | 340/903 |
| 6,292,136 B1 * | 9/2001 | Egnell | 342/432 |
| 7,009,554 B1 * | 3/2006 | Mookerjee et al. | 342/195 |
| 7,180,443 B1 * | 2/2007 | Mookerjee et al. | 342/195 |
| 7,248,206 B1 * | 7/2007 | Boka et al. | 342/90 |
| 7,277,047 B1 * | 10/2007 | Mookerjee et al. | 342/195 |
| 7,375,679 B1 * | 5/2008 | Mookerjee et al. | 342/195 |
| 7,626,534 B1 * | 12/2009 | Boka et al. | 342/90 |
| 7,719,461 B1 * | 5/2010 | Mookerjee et al. | 342/95 |
| 8,188,910 B2 * | 5/2012 | Reuillon et al. | 342/195 |
| 8,654,007 B2 * | 2/2014 | Allam et al. | 342/195 |
| 8,836,579 B2 * | 9/2014 | Allam et al. | 342/453 |
| 2003/0048224 A1 * | 3/2003 | Benner et al. | 342/451 |
| 2003/0085840 A1 * | 5/2003 | Benner et al. | 342/450 |
| 2004/0075605 A1 * | 4/2004 | Bradford et al. | 342/95 |
| 2004/0233105 A1 * | 11/2004 | Benner et al. | 342/451 |
| 2005/0001759 A1 * | 1/2005 | Khosla | 342/90 |
| 2005/0073433 A1 * | 4/2005 | Gunderson et al. | 340/903 |
| 2006/0082490 A1 * | 4/2006 | Chen et al. | 342/52 |
| 2008/0272956 A1 * | 11/2008 | Pedersen et al. | 342/107 |
| 2008/0300787 A1 * | 12/2008 | Zeng | 701/301 |
| 2012/0221273 A1 * | 8/2012 | Furukawa | 702/94 |
| 2012/0306686 A1 * | 12/2012 | Millet et al. | 342/175 |
| 2013/0099958 A1 * | 4/2013 | Millet et al. | 342/90 |

* cited by examiner

US 9,207,312 B2

MULTI-TARGET DATA PROCESSING FOR MULTI-RECEIVER PASSIVE RADARS IN AN SFN OR MFN MODE

CROSS-REFERENCE TO RELATED APPLICATIONS

This application is a U.S. national phase filing under 35 U.S.C. §371 of PCT/EP2010/062643 filed Aug. 8, 2010, the entire contents of which is incorporated herein by reference.

FIELD

The invention relates to the general field of multistatic radars. It more particularly relates to the field of multi-target tracking from passive multistatic systems.

BACKGROUND

Operating a passive radar system comprising a plurality of transmitters and/or receivers includes a number of difficulties. In practice, each transmitter-receiver pair can be used to construct a bistatic base from which it is possible to implement, in various simple and known ways, the detection and bistatic tracking of objects moving in the space covered by this base. However, in order to know the global air situation of the area covered by the radar system, the information, the tracks, produced by the different bistatic bases forming the system have to be analyzed jointly. Now, this joint analysis comes up against different problems. Some problems are linked to the configuration of the different transmitters (position, transmission frequency) that may be associated with one and the same receiver: for each object detected by the receiver, it is necessary to be able to determine the transmitter originating the signal reflected by this object, otherwise no effective tracking is possible. Other problems are linked to the joint analysis of the information (tracks) produced by bistatic bases consisting of different receivers, each base working in its own relative coordinate system.

There are known methods that can be used, in the case of bistatic bases consisting of a receiver and a number of transmitters transmitting on distinct frequency channels, to determine the transmitter originating such or such a signal received by the receiver. However, there is no method for producing such a distinction in the case of transmitters transmitting the same signal in one and the same frequency channel. Moreover, there is no method that can be used to establish a global air situation by merging the data produced by bistatic bases comprising distinct receivers.

SUMMARY

One aim of the invention is to propose a solution that makes it possible to simultaneously resolve the problems of the multistatic passive systems described previously.

To this end, the subject of the invention is a data processing method for multistatic radar systems comprising a plurality of transmitters and receivers, each receiver being able to be associated with one or more transmitters to form one or more bistatic bases, each receiver producing, at successive times, successive frames of bistatic blips. According to the invention, the method generating and maintaining multi-receiver Cartesian tracks from the bistatic blips generated by the different receivers, it comprises:

a first processing step during which it generates and maintains single-receiver Cartesian tracks, each single-receiver track being constructed from blips formed by a given receiver of the multistatic radar system;

a second processing step during which it generates and maintains multi-receiver Cartesian tracks, each multi-receiver track being derived from the merging of single-receiver tracks and being constructed from the blips forming the merged single-receiver tracks, with bistatic blips not having been used in the step 21 to construct a single-receiver track.

According to the invention, each track generated is characterized by a state vector, a covariance matrix associated with this vector and the list of the bistatic blips having contributed to its formation and its maintenance. The duly generated single-receiver and multi-receiver tracks are updated as and when the frames of blips are produced by the different receivers. The tracks generated are transmitted to the processing means operating downstream of the method.

In a preferred implementation, the first tracking step of the method according to the invention processes the blips produced by each receiver and applies to these blips a processing operation implementing the following processing modules:

a prediction module which determines the predicted state of the single-receiver track considered at the time corresponding to the available frame of blips k, the predicted state being defined by a state vector $\vec{x}_{k|k-1}$ and a covariance matrix $S_{k|k-1}$ associated with this vector;

an association module identifying the blips of a given frame of bistatic blips k that can be associated with a given Cartesian track, taking into account its predicted state $\vec{x}_{k|k-1}$, and be used to update the state of the Cartesian track considered;

a module for testing the divergence of the maintained single-receiver tracks, the divergence of a track characterizing the likelihood of this track relative to the kinematic characteristics of the targets detected;

a filtering module producing, for each existing single-receiver Cartesian track and for a given frame of bistatic blips k, the estimation $\vec{x}_{k|k}$ of the real state vector of each track, this estimation being produced from the predicted state vector of the track $\vec{x}_{k|k-1}$ and from the bistatic blips of the frame k associated with the latter;

an initialization module for initializing single-receiver Cartesian tracks, the initialization being produced by association of bistatic blips not having been associated with an existing track;

a module for merging Cartesian tracks, handling the generation of a single Cartesian track from existing tracks exhibiting similarities, a control module checking, for each Cartesian track, the likelihood of the estimation of the estimated state vector $\vec{x}_{k|k}$ characterizing the track.

The estimated state for each track $\vec{x}_{k|k}$ is used by the prediction module to construct the predicted state vector of the track $\vec{x}_{k+1|k}$ intended to be associated with the blips forming the following frame of bistatic blips k+1.

In another preferred implementation, the second tracking step of the method according to the invention simultaneously processes all the blips produced by the different receivers forming the multistatic radar system, these blips forming a frame of multi-receiver bistatic blips k. For this, it implements the following processing modules:

a prediction module which determines the predicted state of the multi-receiver track considered at the time corresponding to the available frame of the blips k, the predicted state being defined by a state vector $\vec{x}_{k|k-1}$ and a covariance matrix $S_{k|k-1}$ associated with this vector;

a first association module identifying the single-receiver tracks that can be associated, for a given frame of bistatic blips k, with a given multi-receiver track, taking into account the predicted state $\vec{x}_{k|k-1}$, the blips associated with these single-receiver tracks that can be used to update the state of the multi-receiver track considered;

a second association module identifying the blips of a given frame of bistatic blips k which have not been associated with single-receiver tracks in the first step of the method and which can be associated with a given multi-receiver Cartesian track, taking into account its predicted state $\vec{x}_{k|k-1}$, and be used to update the state of the track considered;

a module for testing the divergence of the maintained multi-receiver tracks, the divergence of a track characterizing the likelihood of this track relative to the kinematic characteristics of the detected targets;

a filtering module producing, for each existing multi-receiver Cartesian track and for a given frame of multi-receiver bistatic blips k, the estimation $\vec{x}_{k|k}$ of the real state vector of each track, this estimation being produced from the predicted state vector of the track $\vec{x}_{k|k-1}$ and from the bistatic blips of the frame k associated with the latter;

a module for initializing multi-receiver Cartesian tracks, the initialization being done by association of bistatic blips not having been associated with an existing single-receiver track in the first step of the method and blips associated with single-receiver tracks in the first step of the method, these single-receiver tracks not being associated with any multi-receiver track by the first association module;

a module for merging multi-receiver Cartesian tracks, handling the generation of a single multi-receiver Cartesian track from existing tracks exhibiting similarities, a control module checking, for each multi-receiver Cartesian track, the likelihood of the estimation of the estimated state vector $\vec{x}_{k|k}$ characterizing the track.

The estimated state for each track $\vec{x}_{k|k}$ being used by the prediction module to construct the predicted state vector of the track $\vec{x}_{k+1|k}$ intended to be associated with the blips forming the following frame of multi-receiver bistatic blips k+1.

In a particular implementation, the modules for merging Cartesian tracks of the two processing steps implement the same merging processing operation which considers the Cartesian tracks two by two, this processing operation comprising two phases:

a first phase consisting in determining the tracks exhibiting strong similarities;

a second phase consisting in trying to merge the tracks considered to be similar.

In a particular implementation, the first phase for merging Cartesian tracks comprises:

a first step for determining whether certain tracks appear sufficiently close.

a second step for determining, for two given tracks A and B, whether the state vector and the covariance matrices of the track A are compatible with the measurements relating to the track B;

a third step for determining, for the same given tracks A and B, whether the state vector and the covariance matrices of the track B are compatible with the measurements relating to the track A;

the tracks A and B then form a merged Cartesian track if all the tests carried out during the three steps are positive.

In another particular implementation, the second step of the first phase of the Cartesian track merging processing operation comprises:

a first operation consisting in projecting the state vector and the covariance matrix of a first track A into the different bistatic coordinates of a second track B;

a second operation consisting in checking that the state vector of the track A projected into the different bistatic coordinates of the track B is compatible with the observation associated with the track B for the frame of blips k considered; the check being performed by taking into account the noise that can affect the measurements.

The third step of the first phase of the module for merging Cartesian tracks reproduces a processing operation identical to the second step but reversing the roles played by the tracks A and B.

In a variant of this particular implementation, the second operation of the second step of the Cartesian track merging processing operation performs, for the track A and for each bistatic base having been used to update the state of the track B, the following checks:

the bistatic distance deviation between the observation attached to the track B and the projection of the state of the track A into the base considered is less than a first given value.

the bistatic speed deviation between the observation attached to the track B and the projection of the state of the track A into the base considered is less than a second given value.

the azimuth deviation between the observation attached to the track B and the projection of the state of the track A into the base considered is less than a third given value;

The second operation of the third step of the module for merging Cartesian tracks performs the same checks for the track B and for each bistatic base having been used to update the state of the track A.

In another particular implementation, the Cartesian track merging processing operation implements additional operations making it possible to take into account the age of the tracks A and B considered and to compare the age of these tracks to a minimum age, and to perform, depending on the results of the comparisons:

neither the second step, nor the third step;
only the second step;
only the third step;
the second step and the third step.

According to another particular implementation, the processing operation, implemented by the first step for forming single-receiver Cartesian tracks, also includes an intermediate module, which checks whether the Cartesian tracks updated by the filtering module exhibit a manifest divergence character for which the kinematic data in the Cartesian space extracted from the track considered do not correspond to the type of target considered.

According to another particular implementation, the processing operation, implemented by the second step for forming multi-receiver Cartesian tracks, also includes an intermediate module, which checks whether the Cartesian tracks updated by the filtering module exhibit a manifest divergence character for which the kinematic data in the Cartesian space extracted from the track considered do not correspond to the type of target considered.

According to another particular implementation, the modules for testing the divergence of the maintained Cartesian tracks of the two processing steps implement an identical processing operation which considers a maximum number N of tests that can be performed for one and the same given frame n and a maximum number P of frames separating two consecutive tests on one and the same track, and which performs the test on a new track formed for a given frame n as soon as possible from the appearance of the frame n+P.

According to an implementation of the preceding mode, the modules for testing the divergence of the maintained Cartesian tracks performs the test on a given track if the covariance matrix $S_{k+1|k}$ of the predicted state of the track considered fulfils the following threshold condition:

$$det(S_{k+1|k}) \geq MaxDet$$

in which MaxDet represents a given threshold.

According to another particular implementation, the second processing step includes an additional module which performs, before association of the available single-receiver tracks with the existing multi-receiver tracks, a pre-updating of the existing multi-receiver tracks by means of the blips forming the current frame of multi-receiver bistatic blips k, this module consisting in considering, for each multi-receiver track, the single-receiver tracks having previously been associated with it for the preceding frames of multi-receiver blips k−1 and in associating with the estimation of the multi-receiver track considered, the bistatic blips attached to these single-receiver tracks.

According to another particular implementation, the method according to the invention includes a preliminary processing step consisting in performing a bistatic tracking of the bistatic blips produced by the different receivers forming the multistatic radar system and in assigning each of the blips forming a frame of bistatic blips k, a binary indicator indicating whether the blip considered is or is not associated with a bistatic track.

According to an implementation of the preceding mode, the modules for initializing single-receiver Cartesian tracks and for initializing multi-receiver Cartesian tracks initialize new tracks from the bistatic blips having been used to form bistatic tracks in the preliminary processing step.

According to another implementation of the preceding mode, the modules for associating the bistatic blips with the Cartesian tracks of the two processing steps use an association threshold γ according to whether the considered blip is or is not associated with a bistatic track.

According to another particular implementation, the method according to the invention implements a preliminary processing operation to identify, for each blip, the transmitters from which it manifestly cannot have come.

According to the invention, the different implementations can naturally be combined.

The implementation of the method according to the invention makes it possible, by virtue of an implementation in two steps, to more easily distribute the computation load over a number of parallel processors.

Furthermore, this tracking method includes tests which advantageously make it possible to consider all the possible associations of the blips generated with all the transmitters of the system, which makes it possible to resolve the specific problem of the single frequency channel operating modes (SFN).

Furthermore, inasmuch as the second step of the method uses both the raw blips obtained from the different receivers and the results of the associations previously performed in the first step, the effectiveness of the merging of the data produced by the different receivers is advantageously reinforced.

BRIEF DESCRIPTION OF THE DRAWINGS

The features and benefits of the invention will be better appreciated from the following description, which explains the invention through a particular embodiment taken as a nonlimiting example and which is based on the appended figures, which represent.

DETAILED DESCRIPTION

Figure 1:
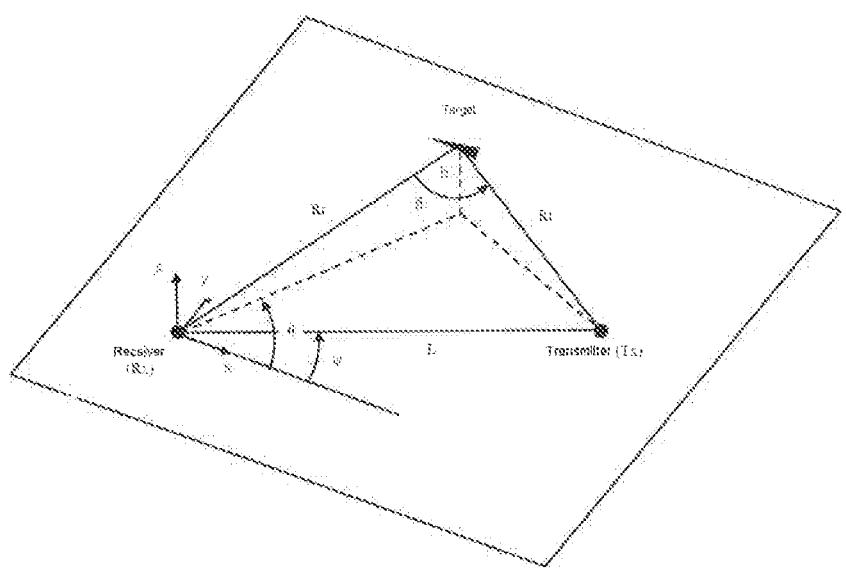
FIG. 1, an illustration for defining the different parameters characterizing an object detected by a bistatic base.

The object of FIG. 1 is to illustrate the known principle of bistatic detection.

The method according to the invention processes the raw data corresponding to the observations performed simultaneously by one or more receivers. Consequently, each bistatic base, consisting of the association of a receiver and a transmitter, is configured to detect an echo for each target moving in the area covered by this base.

The raw observations, or raw blips, extracted from the echoes detected are mainly defined by the following parameters:

the bistatic distance: $D_b = R_r + R_t = \|\vec{x}_{Tg} - \vec{x}_{Rx}\| + \|\vec{x}_{Tg} - \vec{x}_{Tg}\|$ the bistatic speed:

$$V_b = \dot{R}_r + \dot{R}_t = \left(\frac{\vec{x}_{Tg} - \vec{x}_{Tx}}{R_t} + \frac{\vec{x}_{Tg} - \vec{x}_{Rx}}{R_r}\right) \cdot \vec{v}_{Tg}$$

the azimuth:

$$\theta = \arctan\left(\frac{y_{Tg} - y_{Rx}}{x_{Tg} - x_{Rx}}\right)$$

in which:

$\vec{x}_{Tg} = [x_{Tg}\ y_{Tg}\ z_{Tg}]^T$ is the position vector of the target;

$\vec{x}_{Tx} = [x_{Tx}\ y_{Tx}\ z_{Tx}]^T$ is the position vector of the transmitter Tx;

$\vec{x}_{Rx} = [x_{Rx}\ y_{Rx}\ z_{Rx}]^T$ is the position vector of the receiver Rx.

Each observation is here considered to be a centered random Gaussian variable.

For each bistatic base, b, a blip is thus defined by the following state vector and covariance matrix:

$$y_{blip} = [Db\ vb\ \theta]^T$$

$$R_{blip} = \begin{pmatrix} \sigma_{Db}^2 & 0 & 0 \\ 0 & \sigma_{Vb}^2 & 0 \\ 0 & 0 & \sigma_{\theta}^2 \end{pmatrix}$$

At a given time, an image of the aerial situation is simultaneously obtained in the relative coordinate system of each bistatic base. At this time, all the measurements performed by the radar are used to form an instantaneous image, or frame, consisting of the bistatic blips formed by the radar processing operation working upstream of the method responsible for generating the tracks. Thus, for this time, an individual or single-receiver frame is formed with the blips formed from the signals received by each of the receivers forming the radar. Similarly, a multi-receiver frame is formed for this time with the blips formed from the signals received by all the receivers forming the radar.

The time interval T separating the times for which two successive frames of blips are formed is, moreover, defined by the intrinsic operation of the radar. Consequently, by assuming that the frames of blips are referenced in chronological order, the instant t corresponding to the time of availability of a frame can be compared to the number of this frame. Thus, if t is the instant at which the frame k is available for the tracking, the instant t', in which the frame K+1 is in turn available, is equal to t+T.

Hereinafter in the document, the single- or multi-receiver frames are referenced by an index, the current frame, corresponding to the last frame available in time, being defined as the frame k.

The attributes associated with the blips can also be enriched, in particular in an SFN operating mode, with additional information indicating a possible association of a blip with one or more transmitters potentially originating the signal having led to the formation of the blip considered. This information can be formatted in the form of a set of Boolean variables, the size of which corresponds to the number of transmitters which can be associated with the receiver considered. If the association of the blip considered with a given transmitter cannot obviously be made, the Boolean corresponding to this transmitter is set to 0. Otherwise, this Boolean is set to 1.

In addition to these attributes, it is also possible to associate with a blip additional information indicating the probability that this blip is consecutive to a false alarm. This information may, for example, be binary information generated by implementing a bistatic tracking method which links the blips obtained from successive frames. A duly tracked blip has a lower probability than any blip of corresponding to a false alarm.

This additional information is then equal to 0 for the blips not having given rise to the formation of a bistatic track (blips probably corresponding to false alarms) and to 1 for the blips having given rise to the formation of a bistatic track (blips assumed to correspond to real targets).

Figure 2:
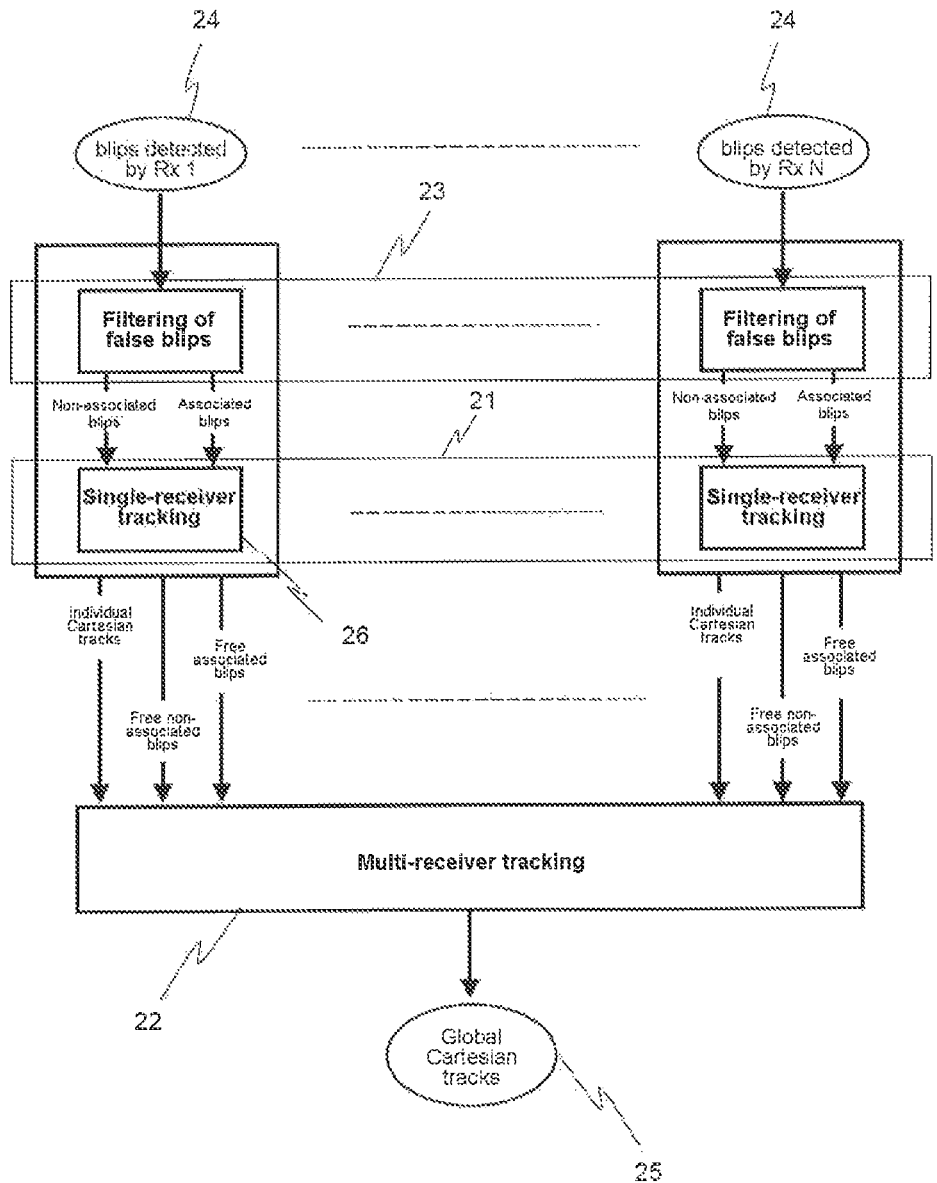
FIG. 2, a general block diagram of the method according to the invention.

FIG. 2 presents the overall block diagram of the method according to the invention.

The object of this method is to construct and maintain Cartesian tracks from the blips formed by the different bistatic bases forming the system considered. A bistatic base consists of a transmitter-receiver pair, bearing in mind that it is possible to form a number of bistatic bases from one and the same receiver. The problem then consisting in certain cases for the receiver in identifying the transmitter originating the detected echo, that is to say, in identifying the bistatic base in which a received echo must be processed by a given receiver.

It will be recalled that a Cartesian track here represents the association over time of a number of bistatic blips generated by a number of bistatic bases and probably corresponding to one and the same target. Whatever their origin, that is to say, the bistatic base from which they are obtained, a set of blips can be represented by a set of Cartesian coordinates in a coordinate system common to all the receivers.

A Cartesian track can be defined by the following attributes:

the Cartesian state of the track, estimated by the tracking method implemented, this state being, for example, represented by a vector of kinematic parameters relating to the target considered in the following form:

$$x_{k|k} = \begin{pmatrix} x \\ v_x \\ y \\ v_y \\ z \\ v_z \end{pmatrix}$$

in which x, y and z are the coordinates estimated by the tracking method for the current frame k representing, at the corresponding time, a target in the Cartesian coordinate system considered and $v_x$, $v_y$ and $v_z$ are the components of the speed vector in the same coordinate system. This estimation is generated from the blips of the frame k and from the predicted state $x_{k|k-1}$ of the track, this state being predicted from the preceding frame k−1.

the associated covariance matrix $S_{k|k}$ describes the accuracy of the estimates of the different components of the vector $\vec{x}_{k|k}$.

the set of the associated blips (i.e. used to construct and maintain the track considered) and their attributes (bistatic distance, bistatic speed and azimuth) and the corresponding standard deviations.

the identities of the transmitters and the receivers with which these blips are associated.

the predicted state $x_{k|k-1}$ of the Cartesian track for the preceding updating step k−1, and the covariance matrix $S_{k|k-1}$.

In order to construct Cartesian tracks from the echoes processed by one and the same receiver, and then to merge, from receiver to receiver, the constructed tracks, the method according to the invention comprises, as illustrated in FIG. 2, two main steps:

a first single-receiver tracking step 21 which mainly consists in aggregating the blips formed by the different bistatic bases sharing the same receiver to form individual Cartesian tracks;

a second multi-receiver tracking step 22 which consists in forming merged Cartesian tracks from the information obtained from the first step 21, that is to say the individual tracks obtained as well as the blips not used to form the individual tracks.

Figure 4:
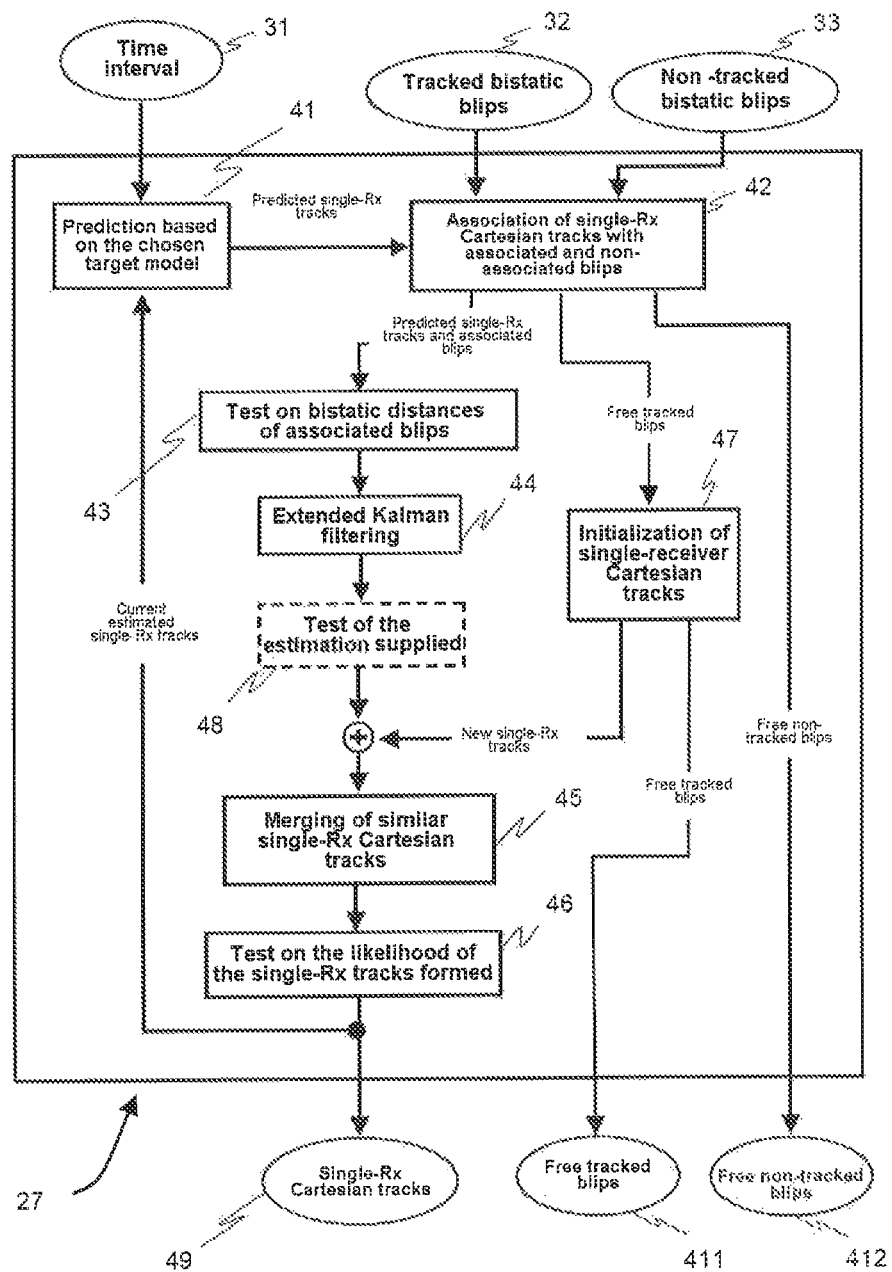
FIG. 4, a block diagram of the single-receiver tracking step of the method according to the invention.

Again according to the invention, the step 21 implements a tracking processing operation 41, illustrated by FIG. 4, which is applied in parallel to the blips detected by each receiver considered separately. The step 22 is actually common to all the receivers. The method according to the invention thus receives blips from the different receivers, in the form of multi-receiver frames, and, after the processing operation, delivers Cartesian tracks resulting from the merging of all the blips available at the instant considered. Furthermore, in a preferred implementation, the step 21 is preceded by a preliminary step 23 for filtering out the false bistatic blips. The expression "false blips" should be understood to mean the blips constructed on erroneous echo detections (false alarms).

The rest of the description gives a more detailed explanation of the operation of the two steps 21 and 22 and of the preliminary step 23 of the method.

As stated previously, the object of the preliminary step 23 is to eliminate the blips resulting from false alarms.

This operation can be performed by different known means. However, a known, advantageous embodiment here consists in considering the bistatic blips 24 delivered by the signal processing means situated upstream of the method according to the invention and in performing a bistatic tracking by any known means, the bistatic tracking being carried out separately for each receiver. A bistatic blip is, as is known, characterized by its attributes which are mainly:

- the measurement of the bistatic distance of the blip, and the standard deviation of this distance measurement;
- the measurement of the bistatic speed of the blip, and the standard deviation of this speed measurement;
- the measurement of the azimuth of the blip and the standard deviation of this azimuth measurement;
- the value of the time interval separating the time of availability of the current frame from the time of availability of the preceding frame.

From a functional viewpoint, in the context of the method according to the invention, the sole function of the implementation of a bistatic tracking method by the preliminary step 23 is to separate the available bistatic blips into two groups:

- the blips which can be associated to form bistatic tracks and which are consequently very likely to correspond to real targets;
- the blips which cannot be associated with any bistatic track and which consequently have little chance of corresponding to real targets.

Consequently, the duly formed bistatic tracks are not analyzed as such by the rest of the method according to the invention.

Figure 3:
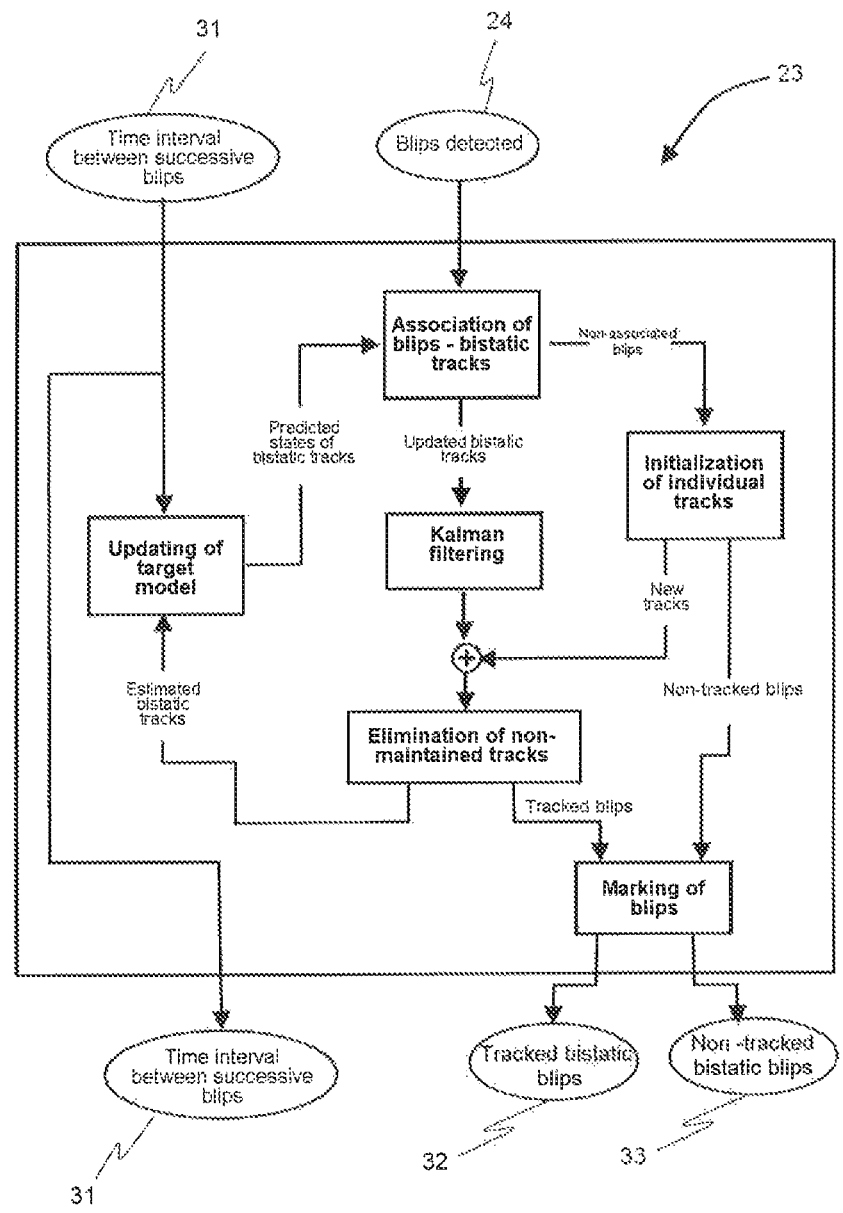
FIG. 3, a block diagram of the false alarm filtering operation implemented by the method according to the invention.

It should be noted here that any known bistatic tracking method can be implemented in the context of the preliminary step 23. FIG. 3 schematically illustrates the functionalities implemented in such a tracking process. However, the latter must be configured so as to restore at the output the value of the time interval 31 separating two consecutive frames, and the bistatic blips supplied by the processing means operating upstream of the method according to the invention. Each blip must also be accompanied by binary information, of Boolean type, indicating whether the blip considered has (tracked blip 32) or has not (non-tracked blip 33) been associated with a bistatic track.

In the context of the invention, each blip can also be accompanied by information indicating all the transmitters of the signal from which the blip considered cannot be obtained. This information is particularly useful in the case of a network of SFN (Single Frequency Network) type in which the transmitters all use the same frequency band and for which it is impossible to determine by the frequency of the corresponding signal the transmitter originating the blip considered. This additional information advantageously makes it possible, in subsequent steps of the method according to the invention, to avoid considering the association of a given blip with one or other of the transmitters.

To produce this information, a series of tests are applied, prior to the step 21, to each bistatic blip 32 and 33, associated or not, in order to determine whether a blip can definitely be considered as not originating from such or such a transmitter.

A first test consists in checking that the bistatic distance of the blip considered is consistent with the distance L separating the transmitter and the receiver considered. It is possible, for example, to consider that, if the relationship $Db+3.\sigma_{Db}>L$ is satisfied, then the blip considered cannot be associated with the base considered.

A second test consists in checking, by making certain assumptions concerning the maximum altitude of the blips formed, that the bistatic distance and the azimuth of the blip considered do not correspond to a Cartesian position very distant from the base considered.

A third test consists in checking, by making certain assumptions concerning the maximum altitude of the blips formed, that the minimum value of the speed of the blip in the Cartesian coordinate system is compatible with a real target, given the bistatic distance, bistatic speed and azimuth values.

It should be noted that, since the first test is the fastest to execute, the order adopted for executing these tests generally corresponds to the order in which they are itemized here. However, any other order of execution can be adopted. Moreover, it is possible to perform only one or two of the tests described here.

The duly distinguished blips 32 and 33 are transmitted to the first processing step 21.

The function of the first step 21 of the method according to the invention is to construct and maintain Cartesian tracks from the blips generated from one and the same receiver. The blips associated to form one and the same track can be derived from the signals transmitted by a single transmitter or else from the signals transmitted by a number of transmitters forming, with the receiver considered, different bistatic bases.

As FIG. 2 illustrates, this first step 21 consists in applying one and the same processing operation, called single-receiver Cartesian tracking, to the blips generated by each receiver considered separately. The structure and the operating principle of this processing 27 are illustrated by FIG. 4.

From the interface point of view, the single-receiver tracking processing operation 41 receives the raw bistatic blips generated by the processing means situated upstream of the method according to the invention associated with the receiver considered, and the value of the time interval separating the current frame k from the preceding frame k–1. In the case where the first frame is preceded by a preliminary step 23 for identifying the false bistatic blips, the blips received by the processing operation 27 are identified blips, each blip being associated with a Boolean which indicates whether or not it has been associated with a bistatic track.

The single-receiver tracking processing operation 27 delivers as output the information relating to the individual Cartesian tracks generated, and the raw blips having contributed to the formation or to the maintenance of a track, each individual Cartesian track being associated with the raw bistatic blips having contributed to the formation or to the maintenance of this track.

The processing operation also supplies the information relating to the blips which have not contributed to the formation or to the maintenance of any track. In the case where the first step 21 is preceded by a preliminary step 23 for identifying the false bistatic blips, these blips may be bistatic blips which have or have not been associated with bistatic tracks.

In the context of the invention, an individual Cartesian track is defined, for a given frame k, by a state vector $\vec{x}_{k|k}$ and by the covariance matrix $S_{k|k}$ which is associated with it. The following can thus be written;

$$\vec{x}_{k|k}=[x_{k|k}\,vx_{k|k}\,y_{k|k}\,vy_{k|k}\,z_{k|k}\,vz_{k|k}]^T$$

in which $[x_{k|k}\,y_{k|k}\,z_{k|k}]$ represents the position of the object tracked in the chosen Cartesian coordinate system and $[vx_{k|k}\,vy_{k|k}\,vz_{k|k}]$ the speed of this object in the same coordinate system.

As FIG. 4 illustrates, the single-receiver tracking step 21 implements a processing operation 27 comprising various modules. This processing operation 27 is applied separately to the frames of bistatic blips formed by one and the same receiver. Thus, if the system considered comprises N receivers, the processing operation 27 is implemented N times simultaneously, as illustrated in FIG. 2.

The overall function of the processing operation implemented is to associate, for one and the same receiver, the blips available at a given instant with individual Cartesian tracks already formed from the blips available at the preceding measurement instants or to initialize new tracks from the blips available having still not been associated with a Cartesian track. To this end, it comprises the various modules described hereinafter in the description.

The processing operation 27 comprises a first module 41, the function of which is to predict the state $x_{k|k-1}$ of each of the tracks for the current frame k from the estimation $x_{k-1|k-1}$ of the state of this track made on the basis of the preceding frame k−1. The prediction of the state of the track considered is thus reflected in the production of a state vector $\vec{x}_{k|k-1}$ and of a covariance matrix $S_{k|k-1}$ predicted for the next measurement instant, defined by the following relationships:

$$\vec{x}_{k|k-1} = F \cdot \vec{x}_{k-1|k-1}$$

$$S_{k|k-1} = F \cdot S_{k-1|k-1} \cdot F^T + Q$$

in which F and Q are defined by the following matrix expressions.

$$F = \begin{pmatrix} 1 & T & 0 & 0 & 0 & 0 \\ 0 & 1 & 0 & 0 & 0 & 0 \\ 0 & 0 & 1 & T & 0 & 0 \\ 0 & 0 & 0 & 1 & 0 & 0 \\ 0 & 0 & 0 & 0 & 1 & T \\ 0 & 0 & 0 & 0 & 0 & 1 \end{pmatrix}$$

and $$Q = \sigma_\gamma^2 \begin{pmatrix} T4/4 & T3/2 & 0 & 0 & 0 & 0 \\ T3/2 & T^2 & 0 & 0 & 0 & 0 \\ 0 & 0 & T4/4 & T3/2 & 0 & 0 \\ 0 & 0 & T3/2 & T^2 & 0 & 0 \\ 0 & 0 & 0 & 0 & 0 & 0 \\ 0 & 0 & 0 & 0 & 0 & 0 \end{pmatrix} +$$

$$\sigma_{v_z}^2 \begin{pmatrix} 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \\ 0 & 0 & 0 & 0 & T3/3 & T2/2 \\ 0 & 0 & 0 & 0 & T2/2 & T \end{pmatrix}$$

T here represents the time interval separating the times at which the frames k−1 and k are available.

The parameter $\sigma_\gamma$ represents the uncertainty on the target movement model used to make the prediction. $\sigma_\gamma$ here can be determined by implementing any appropriate algorithm, for example the Castella filtering algorithm, the effect of which is to increase this value in the case of a maneuvering target, so as to reinforce the tracking capabilities. Increasing $\sigma_\gamma$ in fact amounts to considering that the movement model of the target, given by the matrix F, is not representative of the real movement of the target.

The processing operation 27 also comprises a second module 42, the function of which is to associate the blips available at a given measurement instant with existing Cartesian tracks. The blips available are here the bistatic blips produced by the processing means operating upstream of the method according to the invention. In the preferred implementation comprising a preliminary step 23, these blips are also identified as blips associated with a bistatic track ("tracked blips") or as blips not associated with a bistatic track ("non-tracked blips"). According to the invention, the association of a bistatic blip with a Cartesian track is made by considering the predicted state of the track for the measurement instant corresponding to the blip considered, this state being determined by the updating module 42. Here, the blip constitutes an observation which will confirm or not confirm the predicted trend of the state of the Cartesian track considered.

From a functional point of view, the association mechanism consists in projecting the predicted state vector associated with the Cartesian track considered, and the covariance matrix of this predicted state vector, into a given bistatic base, formed by the receiver considered and by one of the transmitters of the system. This projection can be used to determine, in the given bistatic base, the predicted observation vector formed by the attributes associated for the current frame of blips k. According to the invention, this projection can be made by any known method. A suitable method must, however, imperatively, allow for the estimation of the mean and of the covariance of a random variable, after using a nonlinear function.

Thus, for a given target, the nonlinear function allowing for the projection operation is defined by the following relationships:

$$Db_i = \sqrt{(x_i - x_{Tx})^2 + (y_i - y_{Tx})^2 + (z_i - z_{Tx})^2} +$$
$$\sqrt{(x_i - x_{Rx})^2 + (y_i - y_{Rx})^2 + (z_i - z_{Rx})^2}$$

$$Vb_i = \frac{(x_i - x_{Tx})vx_i + (y_i - y_{Tx})vy_i + (z_i - z_{Tx})vz_i}{\sqrt{(x_i - x_{Tx})^2 + (y_i - y_{Tx})^2 + (z_i - z_{Tx})^2}} +$$
$$\frac{(x_i - x_{Rx})vx_i + (y_i - y_{Rx})vy_i + (z_i - z_{Rx})vz_i}{\sqrt{(x_i - x_{Rx})^2 + (y_i - y_{Rx})^2 + (z_i - z_{Rx})^2}}$$

$$\theta_i = \arctan\left(\frac{y_i - y_{Rx}}{x_i - x_{Rx}}\right)$$

in which i is the identifier of the bistatic base in which the projection is made and in which $X_{Tx}$, $Y_{Tx}$ and $Z_{Tx}$, on the one hand, and $X_{Rx}$, $Y_{Rx}$ and $Z_{Rx}$, represent the respective coordinates of the transmitter and of the receiver in the bistatic base considered; $X_i$, $Y_i$ and $Z_i$ representing the Cartesian coordinates of the target considered, and vx, vy, vz its Cartesian speed. $Db_i$, $Vb_i$ and $\theta_i$ are the coordinates of the target considered, projected into the bistatic base i.

This projection makes it possible to determine the predicted observation vector $y_{k|k-1}$ corresponding, at the instant considered, to the typical blip:

$$y_{k|k-1} = [Db_{k|k-1} Vb_{k|k-1} \theta_{k|k-1}]^T$$

and the associated covariance matrix $R_{k|k-1}$.

This typical blip is then compared to the available blips, the comparison being able to be made by any known method.

This comparison is based on the measurement of the static distance defined by the following relationship:

$$d=(y_{k|k-1}-y_k^{obs})^T \cdot (R_{k|k-1}+R_k^{obs})^{-1} \cdot (y_{k|k-1}-y_k^{obs})$$

in which $y_k^{obs}$ represents the observation vector of the available blip considered and in which $R_k^{obs}$ represents the covariance matrix associated with the vector $y_k^{obs}$.

This static distance d is then compared to a given threshold γ, determined from a table based on the number of degrees of freedom of the expression $(y_{k|k-1}-y_k^{obs})$ and on the probability of false blip-defined track associations. Then, the association condition can be defined by the following relationship:

$$d \leq \gamma$$

The bistatic blip—Cartesian track association operation is thus performed, for each frame of blips, for each track already formed. The available blips for which the observation vector $y_k^{obs}$ satisfies the distance conditions defined previously are associated with the Cartesian tracks considered, while the other blips, whether or not they have been the subject of a bistatic tracking, remain available.

It should be noted that, in the case where, for a given bistatic track, a number of blips satisfy the distance conditions defined previously, only the nearest is retained. Similarly, if a number of tracks can claim to be associated with one and the same blip, the association producing the shortest distance is retained.

The module 42 thus supplies a set of tracks re-updated at the instant considered, and a set of bistatic blips free of any association for which the observation vector is also re-updated. Furthermore, in the case where the step 21 of the method is preceded by the preliminary step 23 for filtering the false bistatic blips, the blips not associated with a Cartesian track and having been the subject of an association with a bistatic track, also called free tracked blips, and the blips not having been the subject of an association with a bistatic track, also called free non-tracked blips, are considered separately, as illustrated in FIG. 4.

It should be noted that, inasmuch as the non-tracked bistatic blips are, inherently, more likely to correspond to false blips, to false alarms, than the tracked blips, it is possible to perform the blip-track association operation by considering a threshold γ that is different in the two cases, reflecting the degree of confidence attributed to the blip considered. The threshold γ may thus be higher for the tracked blips and lower for the non-tracked blips.

It should also be noted that, in the case where the multistatic system considered is of the "SFN" type, the attribute of non-association of a bistatic blip with a given transmitter makes it possible to consider, for each bistatic base, only the blips that do not validate this attribute for the transmitter forming the bistatic base. This preliminary sorting makes it possible to reduce the number of association tests to be performed for each bistatic base.

The processing operation 27 also comprises a third module 43, the function of which is to check the convergent nature of the Cartesian tracks maintained by detecting and eliminating the predicted tracks that are manifestly divergent. For this, the module 43 implements a particular so-called "intersection" processing operation, the function of which is to determine, from the bistatic distances of the raw bistatic blips associated with one and the same track by the module 42 and the associated standard deviations, the most probable position of the intersection of the places (ellipsoid) on which the objects corresponding to these blips may be situated, and the probability associated with this point. Then, if the probability linked to the duly determined intersection is low, that is to say below a given threshold, the Cartesian track associated with these blips is erased and then not processed by the ensuing filtering module 44.

It should be noted here that, since the test carried out requires the determination, for each track that has been associated with blips, of the most probable point of intersection, the processing operation implemented is particularly costly in terms of quantity of calculations, in other words time. Consequently, it is generally not possible, for each measurement instant, for each new frame of blips, to perform this test for each of the existing tracks. The test is therefore performed for each of the tracks with a periodicity which takes account of the number of tracks maintained, of the number of tracks that can be tested between two successive arrivals of frames of bistatic blips and of the acceptable maximum time separating two consecutive tests of one and the same track, this time notably being dependent on the more or less divergent nature of the Kalman filter implemented. The instant for which a track must be tested can be determined in different ways.

It is possible, for example, to consider that, since the number of tests performed for one and the same frame is limited to a given number N and the number P of frames separating two consecutive tests of one and the same track is also fixed, a new track formed for a given frame n must be tested as soon as possible after the appearance of the frame n+P, this condition being reflected in the following alternatives:
  if the number of tracks tested for the frame n+P is less than N, then the track must be tested during the period corresponding to the frame of blips n+P;
  if the number of tracks tested for the frame n+P is greater than N, then the track must be tested during the subsequent period closest to the period corresponding to the frame of blips n+P, for which the number of tracks tested is less than N.

Alternatively, it is possible, for example, to consider that a track must be tested if the covariance matrix $S_{k+1|k}$ of the predicted state of the track considered fulfils the following threshold condition:

$$det(S_{k+1|k}) \geq \text{MaxDet}$$

in which MaxDet represents a given threshold.

It is also possible to envisage considering together the two determination modalities described previously and apply such or such a modality depending on the track considered.

Thus, if it is assumed, for example, that the total number of tracks tested between two arrivals of frames of bistatic blips is limited to ten, that each track must be processed at least once every fifteen frames, and that the current frame is frame five, a new track will be tested when analyzing frame twenty.

The processing operation 27 also comprises a fourth module 44, the function of which is to determine, for each Cartesian track, from the state vector $\vec{x}_{k|k-1}$ and the covariance matrix $S_{k|k-1}$ predicted for the current frame k and from the blips of the current frame associated with the track (observation vector $y_k^{obs}$ and covariance matrix $R_k^{obs}$), the corresponding estimated state vector $\vec{x}_{k|k}$ and covariance matrix $S_{k|k}$.

According to the invention, this operation is performed, as is known, by implementing an extended Kalman filter for example.

It should be noted that, for the Cartesian tracks that have not been the subject of any association for the current frame k, the module 44 operates in a particular mode ("prediction mode") for which the estimated state of the track for the instant considered corresponds to the state predicted by the module 41 for the same instant. The following then apply:

$$\vec{x}_{k|k} = \vec{x}_{k|k-1}$$

and $$S_{k|k} = S_{k|k-1}$$

This particular operation for a given track is, however, possible only during a time interval corresponding to a restricted number of observations, after which the track considered is eliminated.

The processing operation 27 also comprises a fifth module 45, the function of which is to merge the Cartesian tracks deemed sufficiently close to be considered to correspond to one and the same track. The existence of such tracks may result from the initialization of new tracks from the bistatic blips that have not been used to maintain existing tracks, or else from the divergent nature of the Kalman filter implemented to estimate the state vectors of the tracks maintained. This divergent nature is sometimes reflected in the creation of new tracks exhibiting very adjacent positions and speeds.

According to the invention, the module 45 is organized in two phases:
 a first phase consisting in determining the tracks that exhibit strong similarities
 a second phase consisting in trying to merge the tracks considered to be similar.

Figure 5:
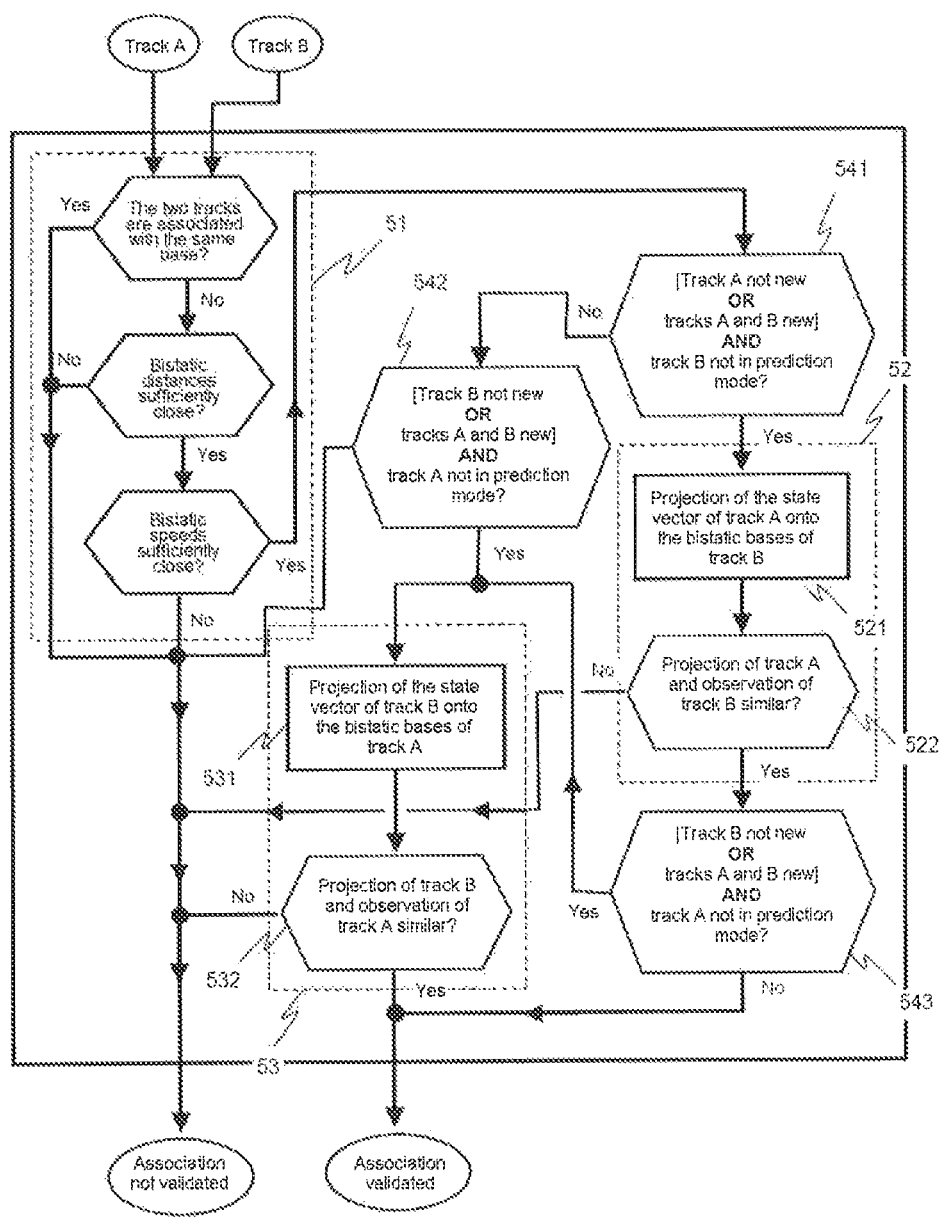
FIG. 5, a block diagram illustrating the first phase of the module for merging individual Cartesian tracks of the single-receiver tracking step of the method according to the invention.

As FIG. 5 illustrates, the first phase in turn comprises three steps 51, 52 and 53.

The first step 51 consists in performing a rough test aiming to determine whether certain tracks appear sufficiently close. More specifically, the tracks being considered two by two, the test consists in determining:
 whether the tracks originate from different bistatic bases
 whether the Cartesian position deviation between the two tracks considered, in one and the same two-dimensional coordinate system (one plane), is less than a given value;
 whether the Cartesian speed deviation between the two tracks considered, in one and the same two-dimensional coordinate system (one plane), is less than a given value.

The second step 52 and the third step 53 concern the groups of two tracks A and B deemed to be sufficiently close in a first analysis.

The second step 52 considers, for each group of two tracks A and B, one of the two tracks, the track A for example, and performs the following operations:
 the first operation 521 consists in projecting the state vector and the covariance matrix of the track A into the different bistatic coordinates of the track B. This projection is, for example, performed by "unscented" transformation.
 the second operation 522 consists in checking that the state vector of the track A projected into the different bistatic coordinates of the track B is compatible with the observation associated with the track B for the instant considered. In other words, a check is made, for each bistatic base that has been used to update the state of the track B, to see if
 the bistatic distance deviation between the observation attached to the track B and the projection of the state of the track A into the base considered is less than a given value.
 the bistatic speed deviation between the observation attached to the track B and the projection of the state of the track A into the base considered is less than a given value.
 the azimuth deviation between the observation attached to the track B and the projection of the state of the track A into the base considered is less than a given value.

The check is carried out here by taking into account the noise that might affect the measurements.

The third step 53 reproduces, through the operations 531 and 532, a processing operation identical to the second step 52, but reversing the roles played by the tracks A and B.

Thereafter, if all the tests performed during the three steps are positive, the tracks A and B are considered to be likely candidates for merging.

It should be noted that, according to the invention, the operation 522 is not executed if the track B is updated in prediction mode, that is to say, if no bistatic blip contributes any longer to updating this track. The same applies for the operation 532 in the case where the track A is updated in prediction mode. The simultaneous occurrence of these two cases also prohibits the association of the tracks A and B.

It should also be noted that, in a particular implementation of the method according to the invention, an additional step 54 can be implemented between the step 52 and the step 53. This step, which provides a better guarantee of the chances of ultimate success of the merging of two tracks, takes into account the age of the tracks considered and compares the age of these tracks to a minimum age. Then, if the age of one of the two tracks is less than this minimum age, the track concerned is considered to be too new and its merging with another track is prohibited. In order to implement this additional step, different age criteria can be retained, the age of a track being able to be defined in different ways. It is thus possible to consider, for example:
 the number of frames of bistatic blips formed, separating the current frame from the frame from which the track was formed;
 the time interval separating the instant considered from the instant for which the track was formed;
 the number of frames for which the association of a bistatic blip with the track considered took place.

Thereafter, when the additional step is implemented, in the form of tests 541, 542 and 543, the progress of the steps 52 and 53 is modified by the insertion of the following tests:
 if the age of the track A is less than the minimum age ("AgeMin") and if the age of the track B is greater than the minimum age, then the step 52 is not implemented and the test performed on completion of the step 51 is applied only to the results of the step 53.
 if the age of the track A is greater than the minimum age ("AgeMin") and if the age of the track B is less than the minimum age, then the step 53 is not implemented and the test performed on completion of the step 51 is applied only to the results of the step 52.
 if the age of the track A is greater than the minimum age ("AgeMin") and if the age of the track B is greater than the minimum age, or if the age of the track A is less than the minimum age ("AgeMin") and if the age of the track B is less than the minimum age, then the steps 52 and 53 are implemented and the test performed on completion of the step 51 is applied only to the results of the two steps.

The second phase of the module 45 for merging similar tracks consists in considering the tracks A and B that have satisfied the tests implemented during the steps 51 to 53 of the first phase and in creating a new track by merging the latter.

According to the invention, this new Cartesian track is represented by a state vector equal to the statistical mean of the state vectors of the merged Cartesian tracks A and B. It is given by the following expression:

$$x_{k|k,fus} = (S_{k|k,A}^{-1} + S_{k|k,B}^{-1})^{-1} \cdot (S_{k|k,A}^{-1} x_{k|k,A} + S_{k|k,B}^{-1} x_{k,kB})$$

Also according to the invention, the associated covariance matrix is equal to the sum of the covariance matrices associated with the state vectors representing the tracks A and B:

$$S_{k|k,fus} = (S_{k|k,A}^{-1} + S_{k|k,B}^{-1})^{-1}$$

This new track is also associated with a set of blips constructed by the grouping together of the blips associated with the tracks A and B.

As stated previously, the module 45 merges the bistatic individual tracks exhibiting a great similarity. These tracks may be tracks already formed and maintained for a certain time or else newly initialized tracks. As FIG. 4 illustrates, the initialization of new tracks is done by a specific initialization module 47. The function of this module is to consider all of the bistatic blips that have not been used as observations to perform the updating of existing Cartesian tracks. Ideally, only the blips identified as having been associated with bistatic tracks, tracked bistatic blips, are taken into account. These blips are associated over time, as and when the measurements are made, so as to determine if an association does not result in the identification of a new track for which the associated blips would constitute the observations. This way, when a new track is identified, it is integrated with all the already existing tracks. This new track is characterized by its state vector, its covariance matrix and the blips that resulted in its initialization are associated with it.

Then, the tracked bistatic blips that have not resulted in the creation of any track at the instant considered are delivered to the multi-receiver tracking step 21, like the non-tracked bistatic blips.

According to the invention, the initialization module can be produced by any known method.

The processing operation 27 also comprises a sixth module 46, the function of which is to detect and eliminate the individual Cartesian tracks that are not likely to correspond to a real target. Such tracks are generally due to the divergent nature of the Kalman filter implemented by the module 44.

For this detection, the module 46 initially compares the speed of the track relative to the ground, in other words without taking into account the altitude parameter, with a given speed threshold, corresponding, for example, to the maximum speed that a real target can reach. Then, if the test is positive, that is to say if the speed of the track considered is below the threshold, the module 46 performs the estimation of the acceleration of the track from the speed values obtained from the state vectors of the track of the current frame $\vec{x}_{k|k}$ and of the preceding frame $\vec{x}_{k-1|k-1}$. This estimation is then compared to a threshold corresponding to the allowable maximum acceleration for a real target.

Then, if a Cartesian track does not satisfy one or other of these tests it is eliminated.

It should be noted that, in a preferred implementation of the method according to the invention, the processing operation 27 also comprises an intermediate module 48, the function of which is to check whether the Cartesian tracks updated at the output of the module 44 exhibit an obvious divergence character. The term "divergence" should be understood to mean that the kinematic data in the Cartesian space extracted from the track considered cannot agree with the type of targets being followed.

To implement this function, it is possible to use various known tests. However, an advantageous test consists in checking the altitude consistency of the successive estimations produced. In practice, the altitude measurement is generally made in relation to a reference plane, a horizontal plane for example. Consequently, the measured altitude can generally be counted as positive or as negative relative to this plane, the position of the blip projected onto this plane being in both cases substantially the same. Furthermore, because the altitude measurement and associated parameters (speed, acceleration, etc.) are generally imprecise, taking these measurements into account can quickly result in a given Cartesian track diverging so that the altitude associated with the track may become incompatible with the trend parameters of the targets detected. To avoid this phenomenon, the module 45 performs a systematic test on the altitude associated with each of the tracks. The test consists mainly in considering two altitude limits, a low limit, generally set at zero or to a low negative value, and a high limit or maximum altitude.

Consequently, the processing operation carried out by the module 48 consists in distinguishing two extreme cases for which the state vector of the track considered is modified with regard to the altitude of the track:

a first case for which, the measured altitude associated with the track at the current instant being close to the low limit, the altitude attributed to the track is equal to the absolute value of the measured altitude.

a second case for which, the measured altitude associated with the track at the current instant being greater than the high limit, the altitude attributed to the track is equal to the maximum altitude.

In these two extreme cases, all the measurements of the quantities derived from the altitude, the climb speed in particular, are set to zero and their covariance matrices reinitialized. In practice, only the part linked to the altitude is modified. The chosen values are default values set in such a way as to continue the tracking operation undamaged. For the state vector, and the associated covariance matrix, defined at the input of the module by:

$$x_{k|k} = \begin{pmatrix} x \\ v_x \\ y \\ v_y \\ z \\ v_z \end{pmatrix}$$

and $$S_{k|k} = \begin{pmatrix} \sigma_{xx}^2 & \sigma_{v_x x}^2 & \sigma_{yx}^2 & \sigma_{v_y x}^2 & \sigma_{zx}^2 & \sigma_{v_z x}^2 \\ \sigma_{xv_x}^2 & \sigma_{v_x v_x}^2 & \sigma_{yv_x}^2 & \sigma_{v_y v_x}^2 & \sigma_{zv_x}^2 & \sigma_{v_z v_x}^2 \\ \sigma_{xy}^2 & \sigma_{v_x y}^2 & \sigma_{yy}^2 & \sigma_{v_y y}^2 & \sigma_{zy}^2 & \sigma_{v_z y}^2 \\ \sigma_{xv_y}^2 & \sigma_{v_x v_y}^2 & \sigma_{yv_y}^2 & \sigma_{v_y v_y}^2 & \sigma_{zv_y}^2 & \sigma_{v_z v_y}^2 \\ \sigma_{xz}^2 & \sigma_{v_x z}^2 & \sigma_{yz}^2 & \sigma_{v_y z}^2 & \sigma_{zz}^2 & \sigma_{v_z z}^2 \\ \sigma_{xv_z}^2 & \sigma_{v_x v_z}^2 & \sigma_{yv_z}^2 & \sigma_{v_y v_z}^2 & \sigma_{zv_z}^2 & \sigma_{v_z v_z}^2 \end{pmatrix}$$

the module modifies the state vector and the covariance matrix as follows:

$$x_{k|k} = \begin{pmatrix} x \\ v_x \\ y \\ v_y \\ z_{Init} \\ 0 \end{pmatrix}$$

-continued and $$S_{k|k} = \begin{pmatrix} \sigma_{xx}^2 & \sigma_{v_xx}^2 & \sigma_{yx}^2 & \sigma_{v_yx}^2 & 0 & 0 \\ \sigma_{xv_x}^2 & \sigma_{v_xv_x}^2 & \sigma_{yv_x}^2 & \sigma_{v_yv_x}^2 & 0 & 0 \\ \sigma_{xy}^2 & \sigma_{v_xy}^2 & \sigma_{yy}^2 & \sigma_{v_yy}^2 & 0 & 0 \\ \sigma_{xv_y}^2 & \sigma_{v_xv_y}^2 & \sigma_{yv_y}^2 & \sigma_{v_yv_y}^2 & 0 & 0 \\ 0 & 0 & 0 & 0 & \sigma_{zz,Init}^2 & 0 \\ 0 & 0 & 0 & 0 & 0 & \sigma_{v_zv_z,Init}^2 \end{pmatrix}$$

in which $\sigma_{zz,Init}$ and $\sigma_{v_zv_z,Init}$ are standard deviation values respectively on the altitude and its time-related derivative which are chosen in such a way as to allow the tracking operation to continue to function. These values are determined by trial and error.

On the other hand, outside these two cases, the module 48 leaves the state vector of the track considered, and the associated covariance matrix, unchanged.

Figure 6:
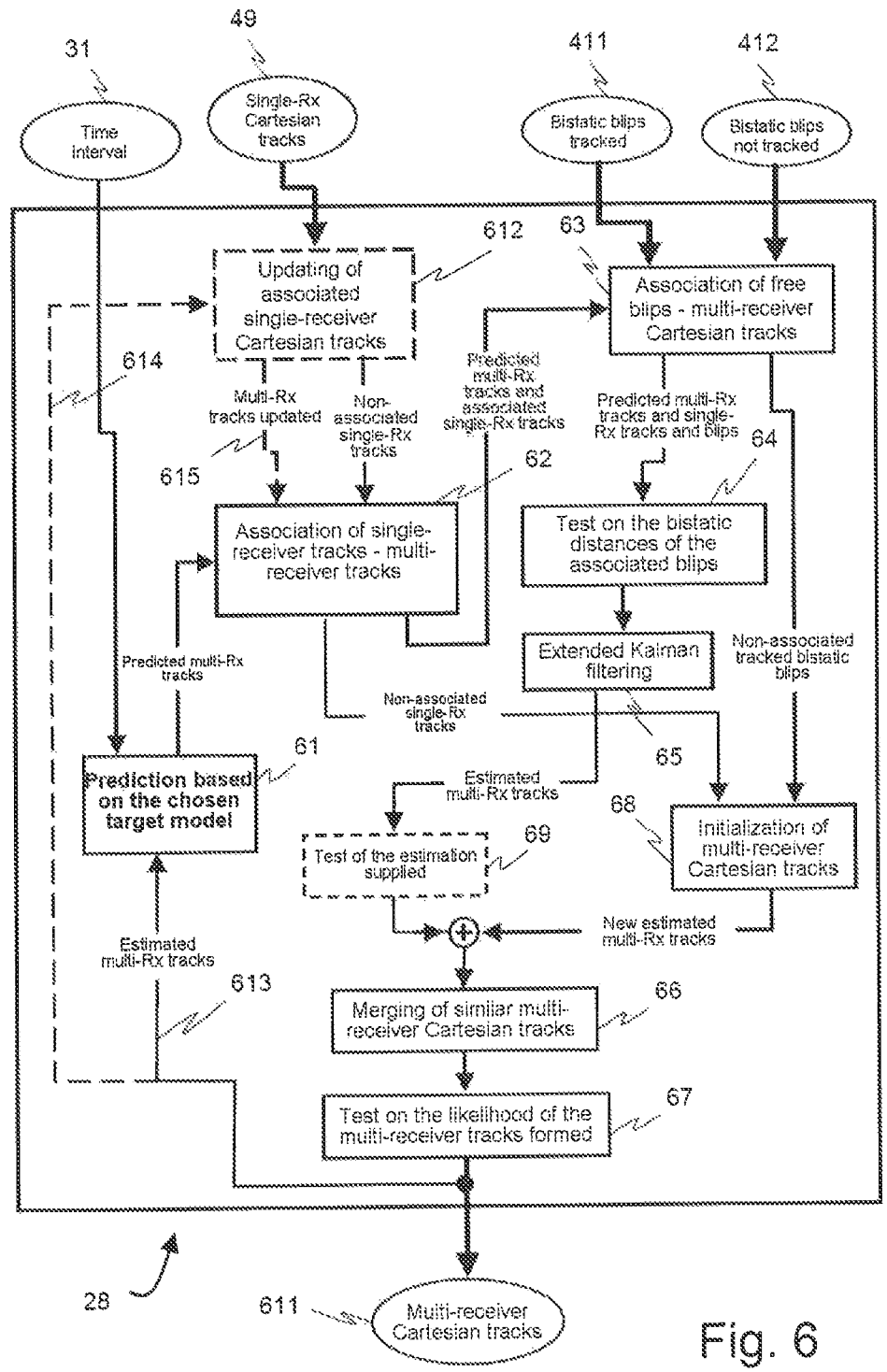
FIG. 6, a block diagram of the multi-receiver tracking step of the method according to the invention.

The second step 22 of the method according to the invention is illustrated by FIG. 6. Its function is to merge, wherever possible, the blips formed by the different receivers relying on the Cartesian tracks generated and maintained during the single-receiver tracking step 21, so as to form tracks that take into account all the receivers. The expressions "multi-receiver tracking" and "merged tracks" apply here.

Generally, the second step of the method according to the invention takes into account the following data:
the free raw bistatic blips, not used during the step 21 to initialize or maintain single-receiver Cartesian tracks (individual Cartesian tracks). In the case where the method according to the invention comprises a preliminary 23 for detecting false blips, these free blips may be:
either tracked bistatic blips 411, that is to say, blips that have been the subject of blip-track associations in the context of the bistatic tracking operation carried out by the additional module;
or non-tracked bistatic blips 412, that is to say, blips that have not been the subject of any blip-track association.
the Cartesian tracks 49 formed in the single-receiver tracking step 21, accompanied by the bistatic blips that have contributed to these tracks and by the corresponding transmitter and receiver positions, a track being characterized by its state vector and the associated covariance matrix;
the time deviation 31 separating two consecutive frames of available bistatic blips.

These data are processed in such a way as to construct global "multi-receiver" Cartesian tracks which result both from the merging of the single-receiver tracks and from the aggregation, on these tracks, of the blips left free by the preceding step 21.

Like the first single-receiver tracking step 21, the multi-receiver tracking step 22 implements a processing operation 28 which comprises a certain number of modules described in the following text.

The function of a first processing module 61 is to update, in pace with the arrival of the single-receiver tracks formed by the module 21, the predicted state vectors $\vec{x}_{k|k-1}$ associated for the current frame with each of the multi-receiver Cartesian tracks already formed. In a way similar to what is done by the module 41 of the processing operation 27 of the step 21, this updating for a given multi-receiver track is performed by predicting the state vector associated with this track at the current measurement instant, based on the estimation of the state $\vec{x}_{k-1|k-1}$ for the preceding frame supplied by the filtering module 63 and on the value of the time interval 31 separating the current frame of blips from the preceding frame.

The function of a second module 62 is to associate the single-receiver Cartesian tracks 49 delivered by the step 21 of the method according to the invention with existing multi-receiver Cartesian tracks.

From a functional point of view, the association mechanism consists here, in a way similar to the module 42, in projecting the predicted state vector, obtained from the module 61, associated with the multi-receiver Cartesian track considered (and the covariance matrix of this state vector) into the bistatic bases of the blips forming the single-receiver tracks 49 that are candidates for association with the multi-receiver track considered. The module 62 thus produces bistatic blip-multi-receiver track associations, the associated blips themselves forming single-receiver tracks formed during the step 21. According to the invention, this projection can be done by any known method, as in the case of the module 42.

To make the association, a check is carried out to see if, among the single-receiver Cartesian tracks supplied by the step 21, there are tracks likely to correspond to multi-receiver Cartesian tracks as follows.

The first step is a raw test mainly consisting in checking that a single-receiver Cartesian track that is a candidate for association and the multi-receiver track considered are sufficiently close to one another to carry out more accurate checks. This raw test comprises the following checks:
a check that the position deviation in a plane of reference of the two tracks considered is below a given threshold.
a check that the speed deviation in a plane of reference of the two tracks considered is below a given threshold.

The next step is the projection of the components of the state vector and of the associated covariance matrix onto the bistatic base of the single-receiver track that is a candidate for association with the multi-receiver track considered. This association is, for example, done by "unscented transformation".

The next step is a check that the projected states of the multi-receiver track considered are compatible with the observations (of the bistatic blips) associated with the single-receiver track that is a candidate for association. This check is done by taking into account the measurement noise.

Consequently, if the checks are positive, the candidate single-receiver Cartesian track, and the bistatic blips associated with this track, are associated with the multi-receiver Cartesian track considered.

It should be noted that the association test is carried out not on the basis of the single-receiver track itself, the existence of which is not considered to be absolutely certain, but on the basis of the bistatic blips forming this track. Similarly, the state vector of the candidate single-receiver track is used only for the first test stage (raw check).

The function of a third module 63 is to associate, for each measurement instant, multistatic blips 411, 412 that have remained free on completion of the step 21 of the method according to the invention, with the predicted multi-receiver track-associated bistatic blip sets constructed by the module 62.

The processing operation performed by this module is similar to the one performed by the module 42 of the step 21 for the association of the bistatic blips with the predicted single-receiver Cartesian tracks, the main difference lying in the fact that it includes an additional computation loop intended to take into account the fact that the projections made are performed on each receiver, so as to project the predicted state of the multi-receiver base considered into each bistatic base.

The module 63 thus makes multi-receiver track-bistatic blip associations. Furthermore, on completion of its implementation, and in the case where the method according to the invention comprises a preliminary step 23 for detecting false blips, the non-tracked blips 412 that are not used are definitively eliminated.

It may be that, for the multi-receiver track considered, blips have already been associated with certain bistatic bases before the module 63. This may happen, for example, when one or more single-receiver tracks have been associated with it in the module 62. In this case, the module 63 is prohibited from associating with it blips for the bistatic bases already provided.

The function of a fourth module 64 is to check the convergent nature of the multi-receiver Cartesian tracks maintained by detecting and eliminating the predicted tracks that are obviously divergent. For this, the module 64 implements a particular so-called "intersection" processing operation, similar to the one described in the case of the processing module 43 of the step 21. Similarly, if the probability linked to the determined intersection is low, that is to say, below a given threshold, the multi-receiver Cartesian track associated with the bistatic blips considered is erased and then not processed by the ensuing filtering module 65.

It should be noted here that, as in the case of the module 43, the test carried out is particularly costly in terms of quantity of calculations, that is to say, time. Consequently, it is generally not possible, for each measurement instant, for each new frame of blips, to perform this test for each of the existing tracks. The test is therefore carried out for each of the tracks with a periodicity which takes into account the number of tracks maintained, the number of tracks that can be tested between two successive arrivals of frames of bistatic blips and the acceptable maximum time separating two consecutive tests of one and the same track, this time notably being dependent on the more or less divergent nature of the Kalman filter implemented.

The function of a fifth processing module 65 is to determine, for each multi-receiver Cartesian track, from the state vector $\vec{x}_{k|k-1}$ and from the covariance matrix $S_{k|k-1}$ predicted for the instant considered, and from the free bistatic blips or those deriving from single-receiver tracks associated with the multi-receiver track considered (observation vector $y_k^{obs}$ and associated covariance $R_k^{obs}$), the state vector $\vec{x}_{k|k}$ and the covariance matrix $S_{k|k}$ estimated for the current frame.

According to the invention, this operation is carried out, in a known manner, by implementing an extended Kalman filter.

According to the invention, the module 63 is implemented in a way similar to the module 44 of the step 21.

The function of a sixth module 66 is to merge the Cartesian tracks deemed to be sufficiently close to be considered to correspond to one and the same track. The existence of such tracks may result from the initialization 68 of new tracks on the basis of the free tracked bistatic blips or the single-receiver Cartesian tracks that have not been used to maintain existing multi-receiver Cartesian tracks. It may also result from the divergent nature of the Kalman filter implemented to estimate the state vectors of the tracks maintained, this divergent nature sometimes being reflected in the creation of new tracks exhibiting positions and speeds that are very adjacent and are very likely to correspond to one and the same object.

According to the invention, the module 66, in a way similar to the module 45 of the step 21, is organized in two phases:
a first phase consisting in determining the tracks that exhibit strong similarities,
a second phase consisting in trying to merge the tracks considered to be truly similar.

The first phase in turn comprises three steps identical to the steps 51, 52 and 53 of the first phase of the module 45.

The function of the initialization module 68 is to consider all the bistatic blips and single-receiver tracks which have not been used as observations in order to update existing multi-receiver Cartesian tracks. In the ideal case, illustrated by FIG. 6, in which the method comprises a step 23, only the tracked bistatic blips 411 are used in this initialization module.

These blips and these tracks are associated over time, in pace with the observations, so as to determine whether an association does not result in the identification of a new multi-receiver track for which these free blips and for which the blips associated with these single-receiver tracks would constitute the observations. This way, when a new track is identified, it is integrated with all the tracks that already exist. This new track is characterized by its state vector, its covariance matrix and the blips that resulted in its initialization. On the other hand, the bistatic blips and the single-receiver tracks not used by the initialization module are definitively eliminated.

According to the invention, this initialization module can be implemented like the module 47 of the step 21 by any known method.

The function of a seventh module 67, like the module 46 of the step 21, is to detect and eliminate the individual Cartesian tracks that are not likely to correspond to a real target. To make this detection, the module 67 implements a processing operation similar to the one implemented by the module 46 and initially compares the speed of the track relative to the ground with a given speed threshold, and, if the test is positive, compares the acceleration of the track with a given acceleration threshold.

Then, if a multi-receiver Cartesian track does not satisfy one or other of these tests, it is eliminated.

The module 67 thus delivers, for each multi-receiver Cartesian track maintained that is deemed valid, an estimation of this track, that is to say, an estimation for the frame of blips considered of the state vector characterizing the track considered and of the covariance matrix associated with this vector.

This information 611 is used by the module 61 to produce an estimation of the state of the track at the following observation instant. It is also delivered following the processing operation situated downstream of the method according to the invention, accompanied notably, for each multi-receiver track duly formed and maintained, by all the bistatic blips and their attributes having been used to construct this track, as well as the identification, the number, of the single-receiver tracks that have been associated with this track.

It should be noted that, in a preferred implementation of the method according to the invention, the step 22 also comprises an intermediate module 69, the function of which is to check, like the module 48 of the step 21, whether the Cartesian tracks updated at the output of the module 65 exhibit an obvious divergence character. This additional module is implemented in a way similar to the module 48 by considering a reference projection plane, the positioning plane of the base considered, for example, and a lower threshold and an upper threshold of altitude. In the two extreme cases (altitude too low or too high) defined previously, all the measurements of the quantities derived from the altitude, the speed of climb in particular, are set to zero and their covariance matrices reinitialized. On the other hand, outside of these two cases, the module 48 leaves the state vector of the track considered, and the associated covariance matrix, unchanged.

It should also be noted that, in an implementation that is also preferred, the step 22 also comprises a processing module 612, the function of which is to pre-update, before prediction, the existing multi-receiver tracks by means of the blips forming the current frame. This module consists in initially considering, for each multi-receiver track, the single-receiver tracks that have previously been associated with it for the preceding frames of blips either to update the track considered or to participate in initializing this track. Then, the blips attached to the single-receiver tracks are automatically associated with the multi-receiver tracks concerned. These blips will be used subsequently in the processing module 65 performing the update of the state vectors of the multi-receiver tracks.

It should be noted that, in this variant implementation of the invention, given that the identification numbers of the single-receiver tracks that have been used to initialize a given multi-receiver track are stored, the module 612 does not check the founding of these associations and only the stored tracks are taken into consideration in this module. The other single-receiver tracks are transmitted directly to the association module 62.

The invention claimed is:

1. A data processing method implemented by multistatic radar systems comprising a plurality of transmitters and receivers, each receiver being able to be associated with one or more transmitters to form one or more bistatic bases, each receiver producing, at successive times, successive frames of bistatic blips, the method generating and maintaining multi-receiver Cartesian tracks from the bistatic blips generated by the different receivers, said data processing method comprising:

a first processing step during which said data processing method generates and maintains single-receiver Cartesian tracks, each single-receiver track being constructed from blips formed by a given receiver of the multistatic radar system;

a second processing step during which said data processing method generates and maintains multi-receiver Cartesian tracks, each multi-receiver track being derived from the merging of single-receiver tracks and being constructed from the blips forming the merged single-receiver tracks, with bistatic blips not having been used in the first processing step to construct a single-receiver track;

the duly generated single-receiver and multi-receiver tracks being updated as and when the frames of blips are produced by the different receivers; the generated tracks, comprising a state vector, a covariance matrix associated with this vector and the list of the bistatic blips having contributed to their formation and their maintenance, being transmitted to the processing means operating downstream of the method.

2. The method as claimed in claim 1, wherein the first processing step processes the blips produced by each receiver and applies to these blips a processing operation implementing the following processing sub steps:

a prediction sub step which determines the predicted state of the single-receiver track considered at the time corresponding to the available frame of blips k, the predicted state being defined by a state vector $\vec{x}_{k|k-1}$ and a covariance matrix $S_{k|k-1}$ associated with this vector;

an association sub step for identifying the blips of a given frame of bistatic blips k that can be associated with a given track, taking into account its predicted state $\vec{x}_{k|k-1}$, and be used to update the state of the track considered;

a sub step for testing the divergence of the maintained single-receiver tracks, the divergence of a track characterizing the likelihood of this track relative to the kinematic characteristics of the targets detected;

a filtering sub step for producing, for each existing single-receiver Cartesian track and for a given frame of bistatic blips k, the estimation $\vec{x}_{k|k}$ of the real state vector of each track, this estimation being produced from the predicted state vector of the track $\vec{x}_{k|k-1}$ and from the bistatic blips of the frame k associated with the latter;

an initialization sub step for initializing single-receiver Cartesian tracks, the initialization being produced by association of bistatic blips not having been associated with an existing track;

a merging sub step for merging Cartesian tracks, handling the generation of a single Cartesian track from existing tracks exhibiting similarities, a control sub step for checking, for each Cartesian track, the likelihood of the estimation of the estimated state vector $\vec{x}_{k|k}$ characterizing the track, the estimated state for each track $\vec{x}_{k|k}$ being used during the prediction sub step to construct the predicted state vector of the track $\vec{x}_{k+1|k}$ intended to be associated with the blips forming the following frame of bistatic blips k+1.

3. The method as claimed in claim 1, wherein the second processing step simultaneously processing all the blips produced by the different receivers forming the multistatic radar system, these blips forming a frame of multi-receiver bistatic blips k, it implements the following processing sub steps:

a prediction sub step which determines the predicted state of the multi-receiver track considered at the time corresponding to the available frame of the blips k, the predicted state being defined by a state vector $\vec{x}_{k|k-1}$ and a covariance matrix $S_{k|k-1}$ associated with this vector;

a first association sub step for identifying the single-receiver tracks that can be associated, for a given frame of bistatic blips k, with a given multi-receiver track, taking into account the predicted state $\vec{x}_{k|k-1}$, the blips associated with these single-receiver tracks that can be used to update the state of the multi-receiver track considered;

a second association sub step for identifying the blips of a given frame of bistatic blips k which have not been associated with single-receiver tracks in the first step of the method and which can be associated with a given multi-receiver Cartesian track, taking into account its predicted state $\vec{x}_{k|k-1}$ and be used to update the state of the track considered;

a sub step for testing the divergence of the maintained multi-receiver tracks, the divergence of a track characterizing the likelihood of this track relative to the kinematic characteristics of the detected targets;

a filtering sub step for producing, for each existing multi-receiver Cartesian track and for a given frame of multi-receiver bistatic blips k, the estimation $\vec{x}_{k|k}$ of the real state vector of each track, this estimation being produced from the predicted state vector of the track $\vec{x}_{k|k-1}$ and from the bistatic blips of the frame k associated with the latter;

a sub step for initializing multi-receiver Cartesian tracks, the initialization being done by association of bistatic blips not having been associated with an existing single-receiver track in the first step of the method and blips associated with single-receiver tracks in the first step of the method, these single-receiver tracks not being associated with any multi-receiver track during the first association sub step;

a sub step for merging multi-receiver Cartesian tracks, handling the generation of a single multi-receiver Cartesian track from existing tracks exhibiting similarities, a control sub step for checking, for each multi-receiver Cartesian track, the likelihood of the estimation of the estimated state vector $\vec{x}_{k|k}$ characterizing the track, the estimated state for each track $\vec{x}_{k\,k}$ being used by the prediction sub step to construct the predicted state vector of the track $\vec{x}_{k+1|k}$ intended to be associated with the blips forming the following frame of multi-receiver bistatic blips k+1.

4. The method as claimed in claim 2, wherein the sub steps for merging Cartesian tracks of the two processing steps implement the same merging processing operation which considers the Cartesian tracks by pair, this processing operation comprising two phases:

a first phase consisting in determining the tracks exhibiting strong similarities, this comprising:
  a first step for determining whether certain tracks appear close, this test determining:
    whether the tracks originate from different bistatic bases
    whether the Cartesian position deviation between the two tracks considered, in one and the same two-dimensional coordinate system, is less than a given value;
    whether the Cartesian speed deviation between the two tracks considered, in one and the same two-dimensional coordinate system, is less than a given value;
  a second step for determining, for two given tracks A and B, whether the state vector and the covariance matrices of the track A are compatible with the measurements relating to the track B, this sub step comprises
    a first sub step consisting in projecting the state vector and the covariance matrix of a first track A into the different bistatic coordinates of a second track B;
    a second sub step consisting in checking that the state vector of the track A projected into the different bistatic coordinates of the track B is compatible with the observation associated with the track B for the frame of blips k considered; the check being performed by taking into account the measurement noise;
  a third step for determining, for the same given tracks A and B, whether the state vector and the covariance matrices of the track B are compatible with the measurements relating to the track A, this sub step reproducing a processing operation identical to the second step but reversing the roles played by the tracks A and B;
  the tracks A and B forming a merged Cartesian track if all the tests carried out during the three steps are positive;
a second phase consisting in trying to merge the tracks considered to be similar.

5. The method as claimed in claim 4, wherein the second sub step of the second step of the Cartesian track merging processing operation performs, for the track A and for each bistatic base having been used to update the state of the track B, the following checks:
  the bistatic distance deviation between the observation attached to the track B and the projection of the state of the track A into the base considered is less than a first given value;
  the bistatic speed deviation between the observation attached to the track B and the projection of the state of the track A into the base considered is less than a second given value;
  the azimuth deviation between the observation attached to the track B and the projection of the state of the track A into the base considered is less than a third given value;
the second sub step of the third step of the sub step for merging Cartesian tracks performing the same checks for the track B and for each bistatic base having been used to update the state of the track A.

6. The method as claimed in claim 4, wherein the Cartesian track merging processing operation implements additional sub steps making it possible to take into account the age of the tracks A and B considered and to compare the age of these tracks to a minimum age, and to perform, depending on the results of the comparisons:
  neither the second step, nor the third step;
  only the second step;
  only the third step;
  the second step and the third step.

7. The method as claimed in claim 2, wherein the processing operation, implemented by the first step for forming single-receiver Cartesian tracks, also includes an intermediate sub step, which checks whether the kinematic data, in the Cartesian space, extracted from the Cartesian tracks updated during the filtering sub step do not correspond to the type of target considered.

8. The method as claimed in claim 2, wherein the processing operation, implemented by the second step for forming multi-receiver Cartesian tracks, also includes an intermediate sub step, which checks whether the kinematic data, in the Cartesian space, extracted from the Cartesian tracks updated during the filtering sub step do not correspond to the type of target considered.

9. The method as claimed in claim 2, wherein the sub steps for testing the divergence of the maintained Cartesian tracks of the two processing steps implement an identical processing operation which considers a maximum number N of tests that can be performed for one and the same given frame n and a maximum number P of frames separating two consecutive tests on one and the same track, and which performs the test on a new track formed for a given frame n from the appearance of the frame n+P.

10. The method as claimed in claim 2, wherein the sub steps for testing the divergence of the maintained Cartesian tracks performs the test on a given track if the covariance matrix $S_{k+1|k}$ of the predicted state of the track considered fulfils the following threshold condition:

$$det(S_{k+1|k}) \geq \text{MaxDet}$$

in which MaxDet represents a given threshold.

11. The method as claimed in claim 1, wherein the second processing step includes an additional sub step which performs, before association of the available single-receiver tracks with the existing multi-receiver tracks, a pre-updating of the existing multi-receiver tracks by means of the blips forming the current frame of multi-receiver bistatic blips k, this sub step considering, for each multi-receiver track, the single-receiver tracks having previously been associated with it for the preceding frames of multi-receiver blips k−1 and in associating with the estimation of the multi-receiver track considered, the bistatic blips attached to these single-receiver tracks.

12. The method as claimed in claim 1, wherein it includes a preliminary processing step consisting in performing a bistatic tracking of the bistatic blips produced by the different receivers forming the multistatic radar system and in assigning each of the blips forming a frame of bistatic blips k, a binary indicator indicating whether the blip considered is or is not associated with a bistatic track.

13. The method as claimed in claim 2, wherein the sub steps for initializing single-receiver Cartesian tracks and for initializing multi-receiver Cartesian tracks initialize new tracks from the bistatic blips having been used to form bistatic tracks in the preliminary processing step.

14. The method as claimed in claim 2, wherein the sub steps for associating the bistatic blips with the Cartesian tracks of the two processing steps use an association threshold $\gamma$ according to whether the considered blip is or is not associated with a bistatic track.

15. The method as claimed in claim 1, wherein it implements a preliminary processing operation to identify, for each blip, the transmitters from which it cannot have been obtained.

\* \* \* \* \*